United States Patent [19]

Gordon et al.

[11] Patent Number: 5,409,256

[45] Date of Patent: Apr. 25, 1995

[54] DRIVER-SIDE AIR BAG MODULE ASSEMBLY

[75] Inventors: John E. Gordon, Brookville; Robert E. Huffman, Tipp City; David P. Schenck, Miamisburg; John P. Sparkman, Dayton; Steven W. Stukenborg, Centerville, all of Ohio; Robert E. Bowser, Brighton, Mich.

[73] Assignee: General Motors Corporation

[21] Appl. No.: 177,565

[22] Filed: Jan. 4, 1994

[51] Int. Cl.$^6$ .............................................. B60R 21/20
[52] U.S. Cl. ................... 280/728 A; 280/731; 403/348; 403/349
[58] Field of Search ............. 280/728 A, 731, 732, 280/728 B, 728 R, 730 R, 736, 741; 403/348, 349, 350, 351

[56] References Cited

U.S. PATENT DOCUMENTS

| | | | |
|---|---|---|---|
| 1,131,399 | 3/1915 | McGinley | 403/349 |
| 4,877,264 | 10/1989 | Cuevas | 280/731 |
| 5,087,069 | 2/1992 | Corbett et al. | 280/731 |
| 5,141,247 | 8/1992 | Barth | 280/728 A |
| 5,201,541 | 4/1993 | Jones et al. | 280/728 A |
| 5,277,442 | 1/1994 | Cuevas | 280/728 A |
| 5,310,276 | 5/1994 | Bergers et al. | 403/349 |
| 5,320,379 | 6/1994 | Burnard et al. | 280/728 A |
| 5,333,897 | 8/1994 | Landis et al. | 280/728 A |
| 5,354,093 | 10/1994 | Schenck et al. | 280/728 A |

FOREIGN PATENT DOCUMENTS 4205727 9/1992 Germany ............... 280/728 A

*Primary Examiner*—Margaret A. Focarino
*Assistant Examiner*—Peter C. English
*Attorney, Agent, or Firm*—Charles E. Leahy

[57] ABSTRACT

A driver-side air bag module is mounted to a steering wheel assembly mounting bracket having three mounting apertures. The module comprises a cover, an inflator and a base plate, which are assembled without using fasteners. The base plate has a plurality of arcuately-spaced mounting apertures and mounts three studs. The cover includes a plurality of mating flexible tangs having locking shoulders. The inflator has a peripheral mounting flange which includes three arcuately-spaced locking blades and a plurality of locking tabs projecting from its surface. The base plate has three mating openings each having an adjacent locking abutment. The studs are first staked to the base plate. The cover is assembled by inserting the tangs through the base plate mounting apertures so that the shoulders snap over to engage the base plate. The inflator locking blades are pushed through the base plate mating openings and twisted to pass them over the locking abutments. This traps the base plate between the blades and the mounting flange and abuts the locking tabs with the cover tangs, preventing their removal. Three inflator mounting flange slots receive the studs during assembly. The air bag module is installed by projecting the studs through the steering wheel assembly mounting bracket apertures, where the spring fingers snap into the stud grooves to prevent removal. The locking tangs, tabs and base plate apertures are unequally spaced, and the studs and apertures are unequally spaced to assure a predetermined orientation of the module when installed.

12 Claims, 3 Drawing Sheets

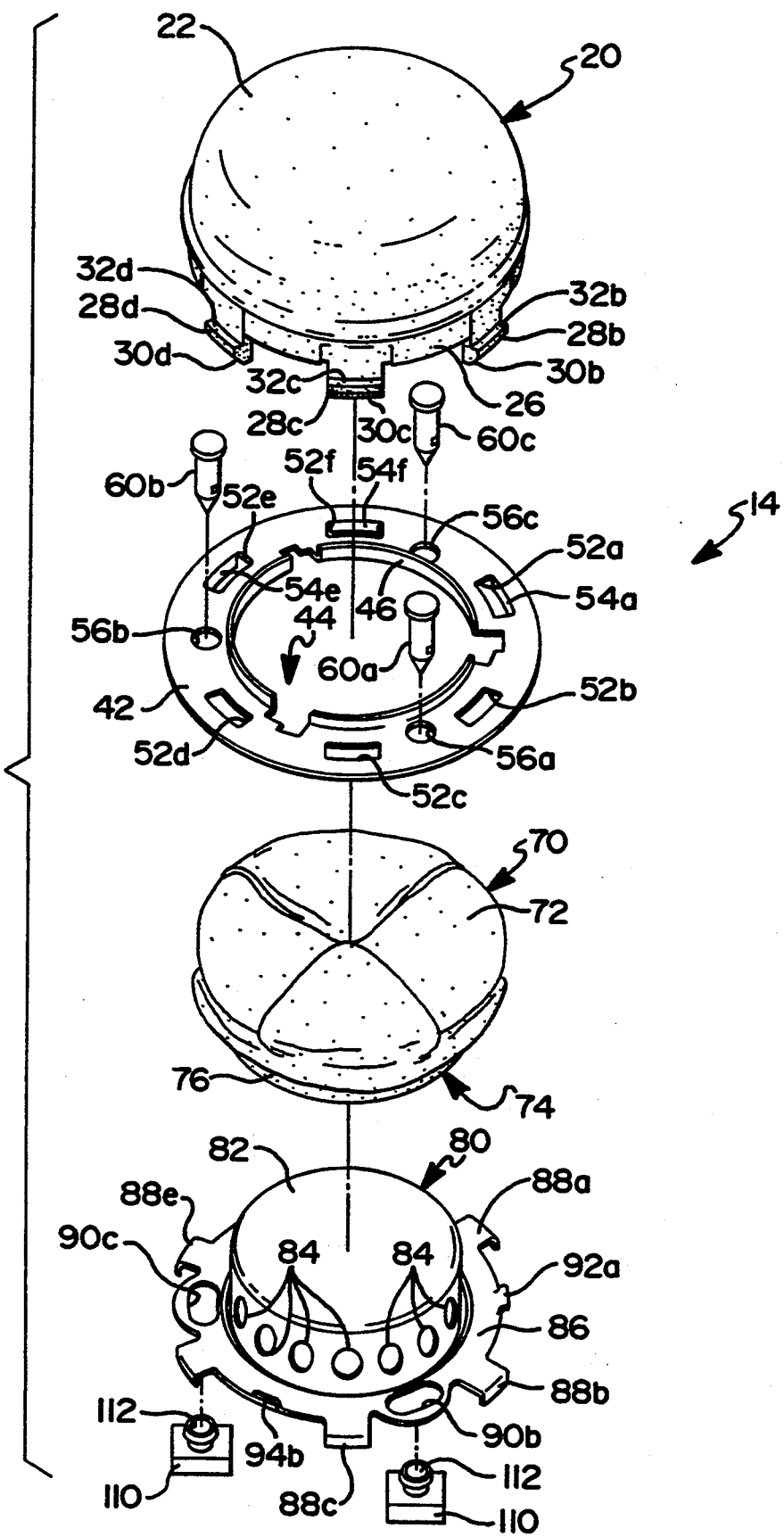

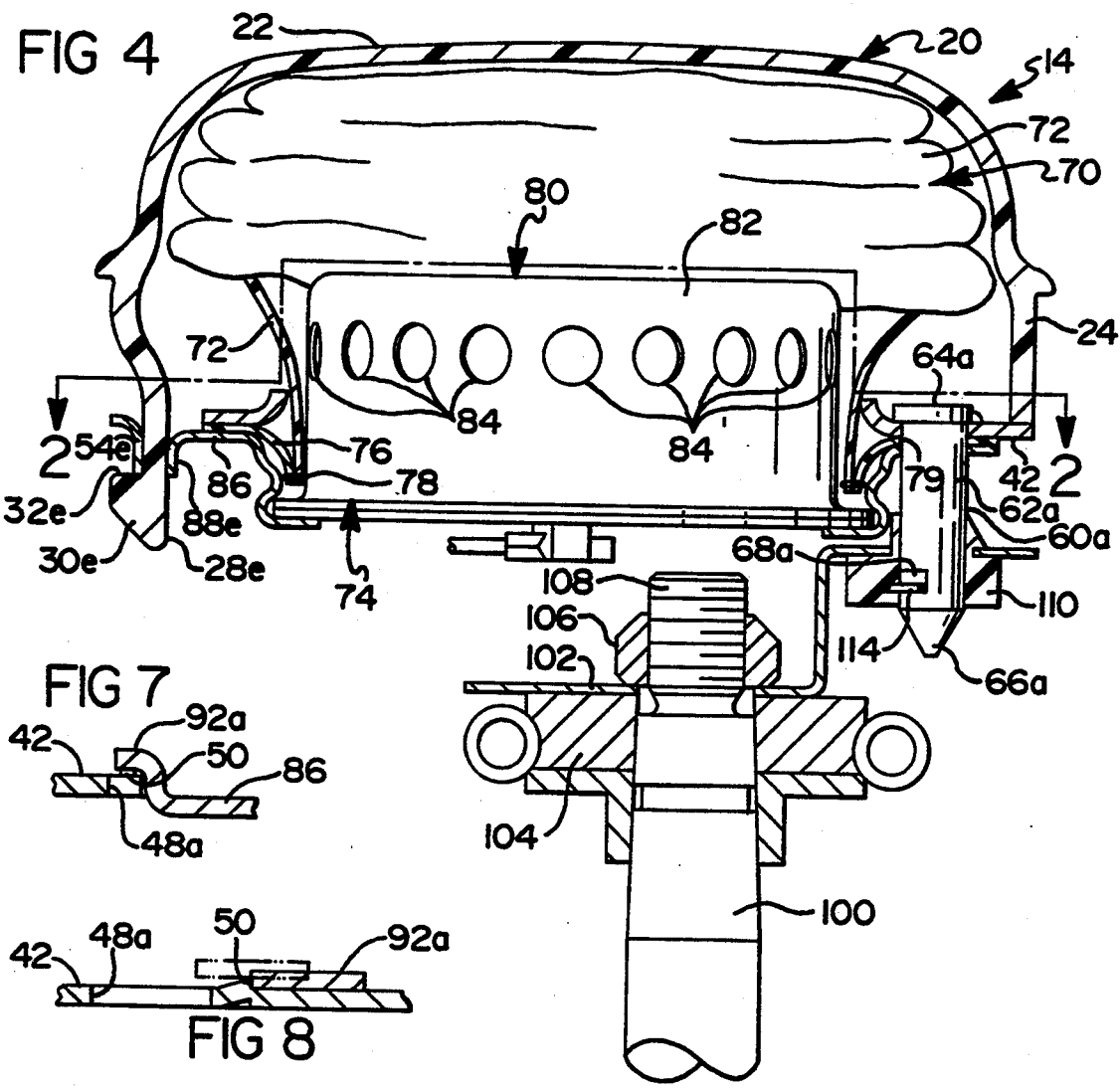
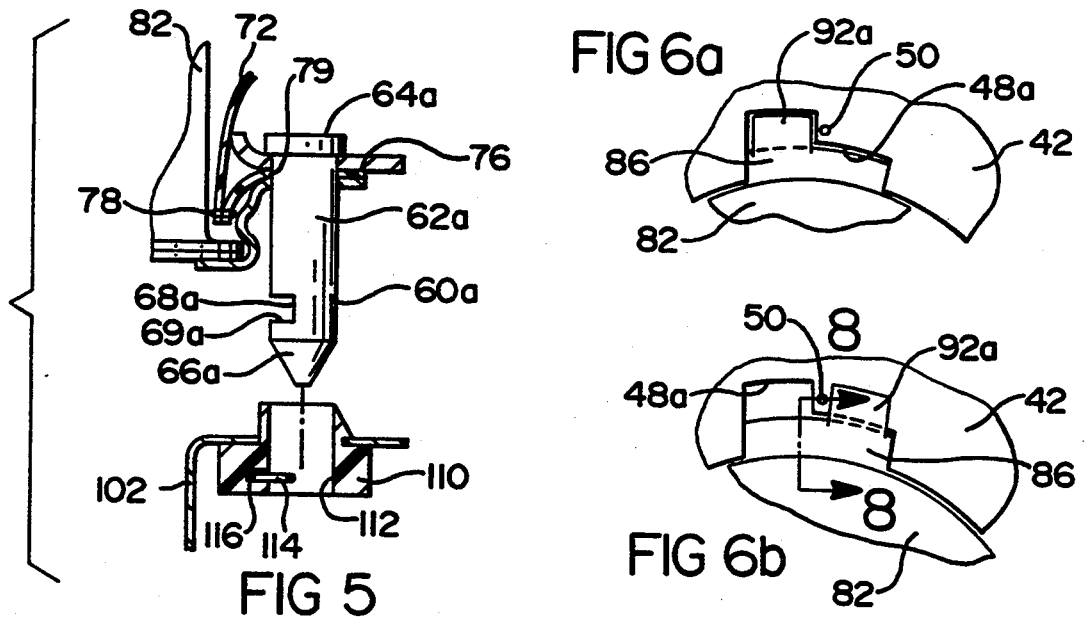

DRIVER-SIDE AIR BAG MODULE ASSEMBLY

BACKGROUND OF THE INVENTION

This invention relates generally to a vehicle air bag module and, more particularly, to the construction and mounting of a driver-side air bag module.

Most passenger vehicles are now fitted with driver-side air bags. These air bags are usually contained in a module which is secured to the vehicle steering wheel assembly by rivets or threaded fasteners. These modules contain an inflator, a container mounting the inflator and the air bag, and a functional and decorative cover enclosing the air bag.

The cover has tear lines which the inflating air bag ruptures to form doors which open to enable the air bag to deploy. The cover is usually attached to the container by rivets, as is the air bag and inflator. The air bag module normally utilizes numerous fasteners and stampings to assemble the component parts together into a module and to mount the module to the steering wheel assembly. Consequently, the structure is complex and assembly is time-consuming.

It would be desirable to provide a driver-side air bag module of reduced complexity which is assembled solely through the use of interengaging surfaces on the component parts and requires no additional fasteners.

It would be further desirable to provide a driver-side air bag module in which the component parts are assembled by using a minimum number of manual manipulations.

SUMMARY OF THE INVENTION

It is therefore an object of this invention to provide a driver-side air bag module of reduced complexity which is assembled solely through the use of interengaging surfaces on the component parts and requires no additional fasteners.

Another object of this invention is to provide a driver-side air bag module in which the component parts are assembled by using a minimum number of manual manipulations.

In one aspect, this invention features an air bag module which mounts to a steering wheel assembly that has a mounting bracket. The module comprises a base plate, an air bag having a mounting collar having a plurality of arcuately-spaced mounting apertures, a cover, and a flanged inflator. The cover has a plurality of arcuately-spaced flexible mounting tangs receivable in the base plate mounting apertures, each tang having a locking shoulder engageable with the base plate when assembled thereto. The inflator mounting flange includes a plurality of arcuately-spaced locking tabs each engageable with a locking tang when the inflator is assembled to the base plate to lock the cover and the base plate together by blocking removal of the tangs through the base plate mounting apertures. Cooperating locking means on the inflator mounting flange and the base plate secure the inflator to the base plate. Air bag securing means secure the air bag mounting collar to the assembled module. Fastening means carried by the module attach the module to the steering wheel mounting bracket.

In another aspect, this invention features an air bag module that is mountable to a steering wheel assembly which has a mounting bracket having spaced mounting apertures. The module comprises a base plate, an air bag, a flanged inflator and means mounting the module on the steering wheel mounting bracket. The steering wheel mounting bracket mounts three spring fingers which project through the apertures. The base plate has a plurality of arcuately-spaced mounting apertures and three arcuately-spaced mounting studs projecting therefrom for insertion in the steering wheel mounting bracket apertures. The studs include retention surfaces which are captured by spring fingers upon insertion of the studs in the apertures to mount the base plate on the steering wheel mounting bracket. The air bag has a mounting collar with three spaced holes therein for receiving the studs to mount the air bag on the base plate. The cover has a plurality of arcuately-spaced flexible mounting tangs receivable in the base plate mounting apertures, each tang having a locking shoulder engageable with the base plate when assembled thereto. The inflator mounting flange has three slots for receiving the studs and includes a plurality of arcuately-spaced locking tabs each engageable with a locking tang when the inflator is assembled to the base plate to lock the cover and the base plate together by blocking removal of the tangs through the base plate mounting apertures. The inflator mounting flange has three spaced locking blades offset therefrom; three mating openings in the base plate are sized to receive the locking blades therethrough. The base plate and the air bag collar are trapped between the inflator locking blades and mounting flanges when the locking blades are projected through the openings and rotated out of alignment therewith.

In yet another aspect, this invention features a method of mounting an inflator, which has a peripheral mounting flange that includes at least two locking blades offset from the mounting flange, to an air bag module base plate, which has mating openings sized to receive the inflator locking blades therethrough, comprising the steps of a. aligning the locking blade with the opening, b. engaging the inflator mounting flange with the base plate to project the locking blades through the openings, c. rotating the inflator relative to the base plate to move the locking blades away from the openings, thus trapping the base plate between the locking blades and the mounting flange to mount the inflator to the base plate and, preferably, d. rotating the inflator relative to the base plate in a direction to pass the locking blades over locking abutments adjacent each opening to trap the locking flange against reverse rotation.

In a further aspect, this invention features a method of assembling an air bag module which includes a cover, an apertured base plate, an air bag having a collar, and an inflator, comprising the steps of a. pushing the cover onto the base plate to engage first locking surfaces on both, b. pushing a folded air bag through the base plate aperture beneath the cover, c. pushing the inflator through the aperture and twisting the inflator to engage second locking surfaces on the inflator and the base plate to clamp the inflator and base plate together with the air bag collar clamped therebetween.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 3 is an exploded perspective view of the air bag module of FIG. 1;

FIG. 4 is an enlarged sectional view of the module, taken along line 4—4 of FIG. 1;

FIG. 5 is an enlarged exploded perspective view of a portion of FIG. 4, illustrating the mounting of the module to a steering wheel mounting bracket;

FIG. 6a and 6b are enlarged detail views of the circled area designated by "6" in FIG. 2;

FIG. 7 is an enlarged sectional view taken along line 7—7 of FIG. 2; and

FIG. 8 is a sectional view taken along line 8—8 of FIG. 6b.

DETAILED DESCRIPTION OF A PREFERRED EMBODIMENT

Figure 1:
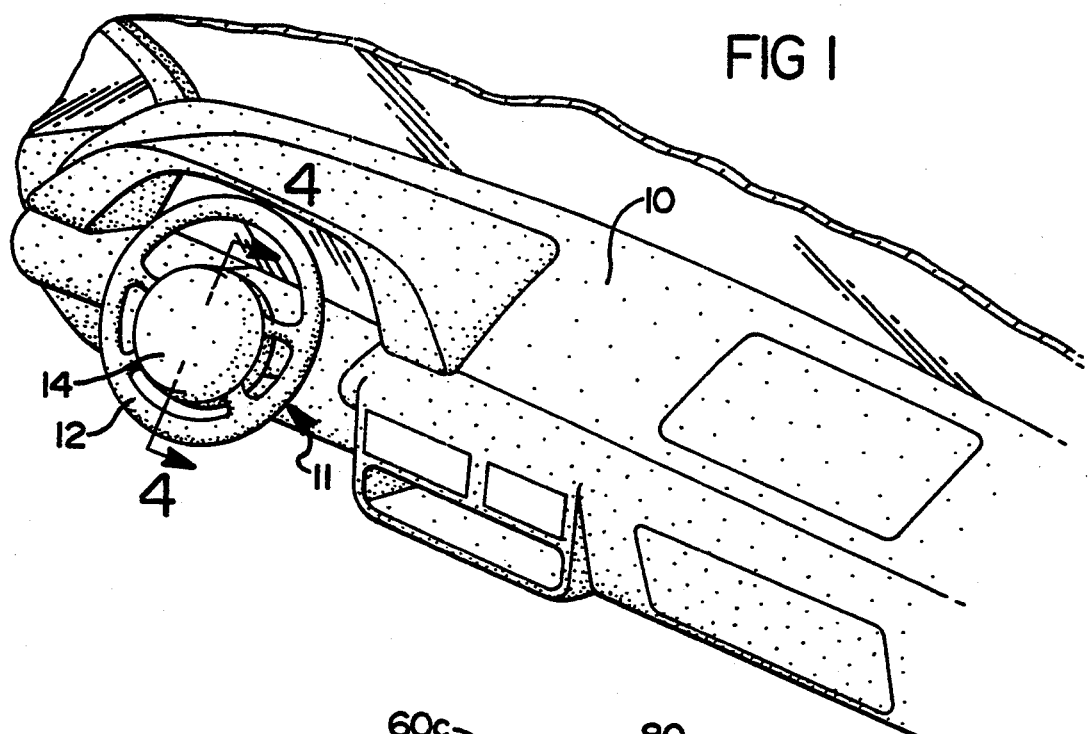
FIG. 1 is a partial perspective view of an automobile instrument panel showing a steering wheel which mounts an air bag module according to this invention.

As shown in FIG. 1, an automobile passenger compartment mounts the usual instrument panel 10 and a steering wheel assembly 11 including a steering wheel 12. Steering wheel assembly 11 mounts a driver-side air bag module 14 centrally of steering wheel 12. As best seen in FIGS. 3 and 4, air bag module 14 comprises a cover 20, a base plate 40, an air bag 70, and an inflator 80.

Figure 2:
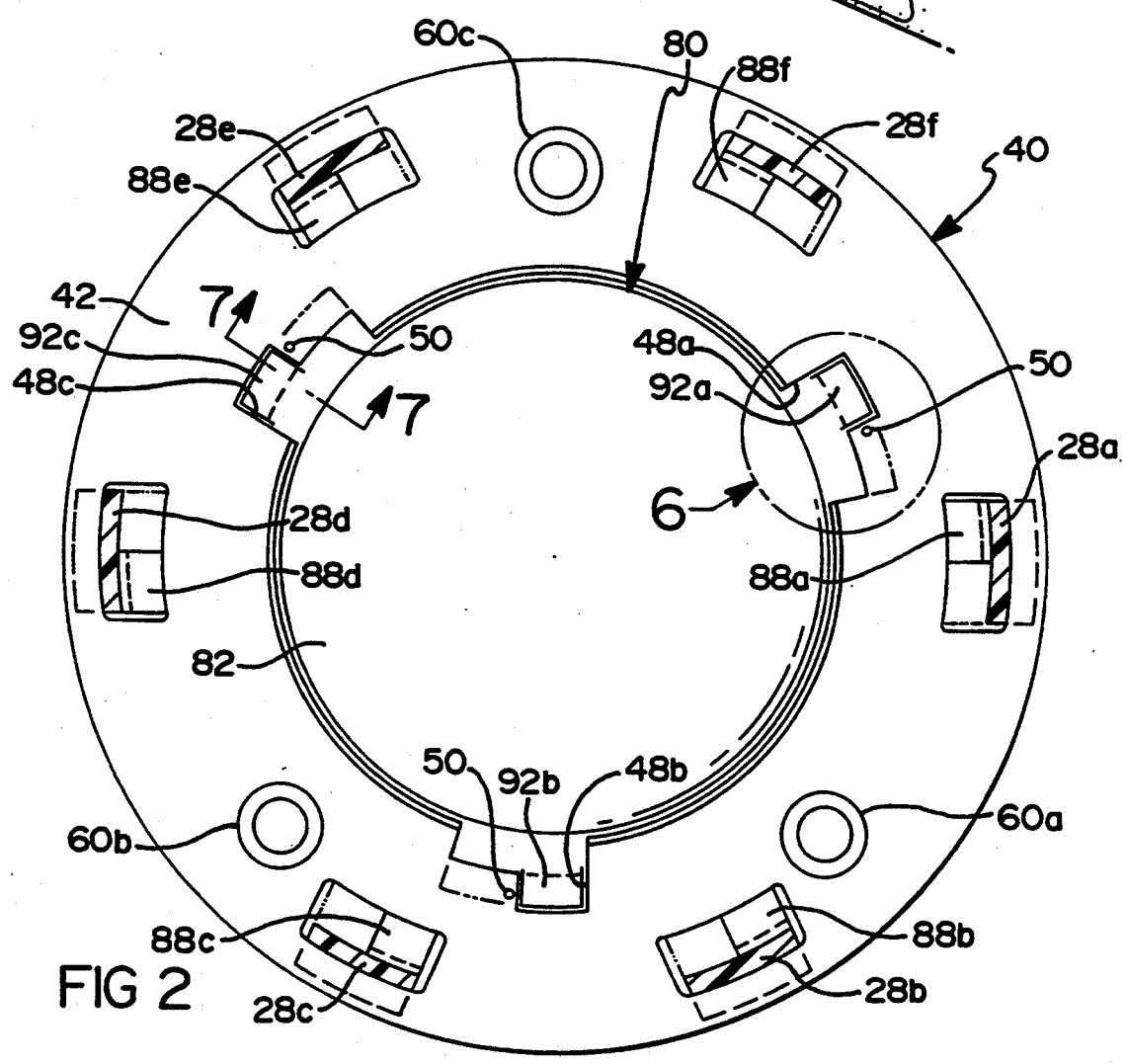
FIG. 2 is a sectional view of the module, taken along line 2—2 of FIG. 4, illustrating the assembly of the inflator to the base plate, with the air bag deleted for clarity.

Module cover 20 is decorative and is made of vinyl or other material which preferably matches steering wheel 12. It comprises a domed main body 22 which conventionally ruptures along a weakened door pattern (not shown) to enable air bag deployment in a well-known manner when a predetermined vehicle deceleration occurs. As shown in FIGS. 2, 3 and 6, peripheral flange 24 depends from main body 22 and terminates in a bottom surface 26 from which depend six identical circumferentially-spaced flexible locking tangs 28a, 28b, 28c, 28d, 28e and 28f. The locking tangs comprise identical tapered noses (only, 30b, 30c, 30d, 30e are shown) that include locking shoulder (only 32b, 32c, 32d, 32e are shown).

Base plate 40 comprises a flat, circular body 42 having a central aperture 44 defined by an upturned flange 46 having three spaced cutouts or openings 48a, 48b and 48c, bounded by lanced locking abutments 50. Six spaced mounting apertures 52a, 52b, 52c, 52d, 52e and 52f are formed by lancing flanges (only 54a, 54e and 54f are shown) out of body 42.

Base plate body 42 has three holes 56a, 56b and 56c punched in it for receiving three mounting studs 60a, 60b and 60c, best seen in FIGS. 4 and 5. Since all three studs are identical, only stud 60a will be described in detail. It has a cylindrical body 62a with a head 64a at one end and a tapered nose 66a at the other. Just behind nose 66a is a slot or notch 68a having a retention surface 69a. Holes 56a, 56b and 56c are sized to tightly receive studs 60a, 60b and 60c.

Air bag 70 is a conventional nylon bag and is illustrated in FIGS. 3, 4 and 5 as comprising a folded body 72 which has a central inflation opening 74. A mounting collar 76 is sewn to bag body 72 about opening 74 by stitching 78. Collar 76 includes spaced mounting holes 79 (only one illustrated) which receive studs 60a, 60b and 60c to mount air bag 70 to base plate 40.

Inflator 80 comprises a domed canister 82 having gas discharge holes 84 about its periphery. Canister 82 is secured to a mounting flange 86 which has six spaced mounting tabs 88a, 88b, 88c, 88d, 88e and 88f which extend outwardly and are bent downwardly. Flange 86 also includes three identical sausage slots (only, 90b and 90c are shown) for receiving studs 60a, 60b and 60c and three upwardly-lanced locking blades 92a, 92b and 92c.

Air bag module 10 is constructed for assembly without the use of the usual bolts, nuts and rivets. It is also designed for assembly which assures a predetermined orientation of cover 20, baseplate 40, air bag 70 and inflator 80 relative to each other in the module and for assuring a predetermined orientation of module 20 relative to steering wheel 12 on steering wheel assembly 11. This assures proper orientation of any graphics on cover 20 and any predetermined deployment of air bag 70.

To provide this predetermined orientation, cover tangs 28b and 28c are located closer to each other than to the other tangs. The corresponding base plate mounting apertures 52b and 52c are likewise located closer to each other, as are inflator locking tabs 88b and 88c, all of which are mated when assembled. This assures the proper orientation of cover 20 upon assembly, which will now be explained, with particular reference to FIGS. 2 and 3.

Studs 60a, 60b and 60c are inserted in holes 56a, 56b and 56c and are staked to base plate 40. Cover 20 is assembled by inserting locking tangs 28a, 28b, 28c, 28d, 28e and 28f through corresponding base plate mounting apertures 52a, 52b, 52c, 52d, 52e and 52f until flange edge 26 engages base plate body 42 and the locking tang shoulders 32a, 32b, 32c, 32d, 32e and 32f snap over the respective base plate flanges 54a, 54b, 54c, 54d, 54e and 54f.

Base plate stud mounting holes 56a, 56b and 56c are unequally spaced about base plate body 42. Air bag collar holes 79 are spaced accordingly, as are inflator slots 90a, 90b and 90c, to accommodate studs 60a, 60b and 60c during assembly. Folded air bag 70 is aligned and pushed through base plate aperture 44 with holes 79 receiving studs 60a, 60b and 60c until collar 76 engages base plate body 42.

Inflator 80 is assembled by aligning locking blades 92a, 92b and 92c with respective base plate openings 48a, 48b, and 48c, as shown in FIGS. 2 and 6a. This also aligns studs 60a, 60b and 60c with respective inflator slots 90a, 90b and 90c. Canister 82 is pushed through aperture 44 until flange 86 engages air bag collar 76 atop base plate body 42. This moves blades 92a, 92b and 92c through openings 48a, 48b and 48c on the other side of body 42, as shown in FIG. 7.

Inflator 80 is then twisted, or rotated clockwise (FIGS. 2 and 6b) to force blades 92a, 92b and 92c over and beyond abutments 50 to spring back into engagement with base plate body 42, as shown in FIG. 8. This locks blades 92a, 92b and 92c against reverse rotation and locks inflator 80 to base plate 40 by trapping body 42 between blades 92a, 92b, 92c and flange 86. It also tightly clamps air bag collar 76 between base plate body 42 and inflator flange 86.

The rotation of inflator 80 also positions locking tabs 88a, 88b, 88c, 88d, 88e and 88f in contact with the backs of respective cover tangs 28a, 28b, 28c, 28d, 28e and 28f, thus locking them into contact with base plate flanges 54a, 45b, 54c, 54d, 54e and 54f and preventing their disassembly back through mounting apertures 52a, 52b, 52c, 52d, 52e and 52f. Elongated slots 90a, 90b and 90c accommodate inflator movement relative to studs 60a, 60b and 60c during this simple "push and twist" assembly.

Air bag module 14 is now fully assembled and ready for installation to steering wheel 12. Referring to FIGS. 3, 4 and 5, steering wheel assembly 11 includes a steering column 100. Steering column 100 clamps a mounting bracket 102 between a plate 104 and a nut 106 which engages threaded end 108 of steering column 100.

Bracket 102 is apertured at three spaced locations. These apertures each mount identical retaining units 110 having a central hole 112. A spring finger 114 mounted in a notch 116 projects into hole 112. To orient air bag module 14 relative steering wheel 12, retaining units 110 have the same unequal spacing as studs 60a, 60b and 60c on module 14. This assures only one possible assembly orientation of module 14 on steering wheel assembly 11. Studs 60a, 60b and 60c (only 60a is shown) are aligned with, and pushed through holes 112. Upon insertion, stud noses 66a, 66b and 66c cam spring fingers 114 aside to enable full stud insertion. As shown in FIGS. 4 and 5, when stud notch 68a registers, spring finger 114 snaps into it and engages notch locking surface 69a to lock the stud against removal. Operation of studs 60b and 60c is identical. This locks air bag module 14 to steering column 100.

Thus, this invention provides a driver-side air bag module that is easily and quickly assembled and uses no fasteners. Instead, locking surfaces on the module components lock them together with only a "push" (cover to base plate), "push" (air bag to base plate within cover), and "push-and-twist" (inflator to base plate). The module is then easily installed to the steering wheel assembly with a final "push".

While only a preferred embodiment has been illustrated and described, obvious modifications thereof are contemplated within the scope of this invention and the following claims.

We claim:

1. An air bag module mountable to a steering wheel assembly, comprising
 a mounting bracket carried by the steering wheel assembly.
 a base plate having a plurality of arcuately-spaced mounting apertures,
 an air bag having a mounting collar,
 a cover having a plurality of arcuately-spaced flexible mounting tangs received in the base plate mounting apertures, each tang having a locking shoulder engaged with the base plate,
 an inflator having a mounting flange including a plurality of arcuately-spaced locking tabs each engaged with a mounting tang to lock the cover and the base plate together by blocking removal of the tangs through the base plate mounting apertures,
 cooperating locking means on the inflator mounting flange and the base plate for securing the inflator to the base plate,
 air bag securing means securing the air bag mounting collar to the module, and
 fastening means carried by the module for attaching the module to the steering wheel mounting bracket.

2. The air bag module of claim 1, wherein the cooperating locking means comprise a locking blade extending from the inflator mounting flange and an opening in the base plate receiving the inflator locking blade therethrough, the base plate being trapped between the locking blade and the mounting flange when the locking blade is projected through the opening and rotated out of alignment therewith.

3. The air bag module of claim 1, wherein the cooperating locking means comprise three spaced locking blades extending from the inflator mounting flange and three mating openings in the base plate receiving the locking blades therethrough, the base plate being trapped between the inflator locking blades and the mounting flange when the locking blades are projected through the openings and rotated out of alignment therewith.

4. The air bag module of claim 3, wherein the base plate includes a locking abutment adjacent each opening, and the blades are forced over the abutments and spring back into contact with the base plate after rotation to trap the inflator blades against reverse rotation.

5. The air bag module of claim 1, wherein the fastening means comprise a plurality of spaced mounting studs projecting from the module into mating apertures in the steering wheel mounting bracket and including retention surfaces captured by cooperating capture means on the steering wheel mounting bracket.

6. The air bag module of claim 5, wherein the air bag securing means comprise mounting holes in the air bag collar receiving the mounting studs to trap the air bag collar between the base plate and the inflator mounting flange.

7. The air bag module of claim 5, wherein the mounting studs and mating steering wheel mounting bracket apertures are unequally spaced to assure a predetermined orientation of the module to the steering wheel when assembled thereto.

8. The air bag module of claim 5, wherein each stud has a cylindrical body terminating in a tapered nose, the retention surfaces comprise a notch in the side of the stud behind the nose, and the capture means comprise spring fingers projecting across the mating apertures that are cammed aside by the tapered noses to enable insertion of the studs into the mating apertures and snap into the notches when the studs are fully inserted.

9. The air bag module of claim 1, wherein one base plate mounting aperture and one corresponding cover tang are unequally spaced from their adjacent apertures and tangs to assure a predetermined orientation of the cover relative to the base plate when assembled thereto.

10. An air bag module mountable to a steering wheel assembly having a mounting bracket with spaced mounting apertures, comprising
 three spring fingers mounted on the steering wheel mounting bracket projecting into the apertures,
 a base plate having a plurality of arcuately-spaced mounting apertures and three arcuately-spaced mounting studs projecting therefrom into the steering wheel mounting bracket apertures and including retention surfaces captured by the spring fingers upon insertion of the studs in the apertures to mount the base plate on the steering wheel mounting bracket,
 an air bag having a mounting collar with three spaced holes therein receiving the studs to mount the air bag on the base plate, a cover having a plurality of arcuately-spaced flexible mounting tangs received in the base plate mounting apertures, each tang having a locking shoulder engaged with the base plate, an inflator having a mounting flange having three slots receiving the studs and including a plurality of arcuately-spaced locking tabs each engaged with a mounting tang to lock the cover and the base plate together by blocking removal of the tangs through the base plate mounting apertures, the inflator mounting flange having three spaced locking blades extending therefrom, and three mating openings in the base plate receiving the locking blades therethrough, the base plate being trapped between the inflator locking blades and mounting flanges and the air bag collar being clamped between the mounting flange and the base plate when the locking blades are projected through the openings and rotated out of alignment therewith.

11. A method of assembling an air bag module which comprises a cover, an apertured base plate, a folded air bag having a collar, and an inflator, comprising the steps of a. pushing the cover onto the base plate to engage first locking surfaces on both, b. pushing a folded air bag through the base plate aperture beneath the cover, c. pushing the inflator through the aperture and twisting the inflator to engage second locking surfaces on the inflator and the base plate to clamp the inflator and base plate together with the air bag collar clamped therebetween.

12. The method of claim 11, wherein twisting the inflator also blocks disengagement of the first locking surfaces.

* * * * *